June 7, 1955     G. J. LUBBEN ET AL     2,710,379

TUNABLE LECHER LINE SYSTEM

Filed Sept. 23, 1953

INVENTORS
GERRIT JAN LUBBEN
MARTEN PLAK

BY

AGENT

United States Patent Office 2,710,379
Patented June 7, 1955

2,710,379
TUNABLE LECHER LINE SYSTEM

Gerrit Jan Lubben and Marten Plak, Eindhoven, Netherlands, assignors to Hartford National Bank and Trust Company, Hartford, Conn., as trustee Application September 23, 1953, Serial No. 381,862

Claims priority, application Netherlands October 10, 1952

4 Claims. (Cl. 333—82)

This invention relates to a Lecher line system which is tunable by means of a bridge adapted to slide over it.

This type of variable oscillatory circuits permits a wide frequency range to be commanded. However, the length of the line and the distance through which the bridge is displaceable are rather considerable which is prohibitive to designing a not too bulky line system.

The present invention provides a practicable construction for a Lecher line system with a sliding bridge, which construction enables a larger frequency range to be commanded than initially known constructions with the same length of displacement of the bridge. According to the invention, this is achieved by making provision that the limbs of the Lecher line system form in cross-section two diametrically opposed arcs of a circle, the bridge being rotatable and slidable between the limbs of the line and comprising two metal parts which, in cross-section, substantially form two diametrically opposed arcs of a circle with the interposition of a capacitor such that in one position the bridge constitutes a capacitor connected between the limbs of the line system and a short circuit in a position turned to 90°.

It is pointed out that the tuning of a Lecher line system, either by means of a short-circuiting bridge or by means of a capacitative bridge, is known per se.

Figure 1:
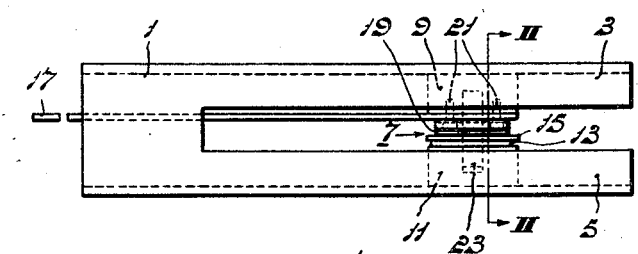
Figure 2:
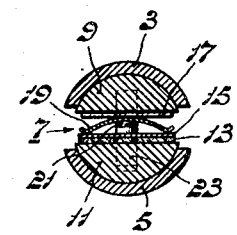
Figure 3:
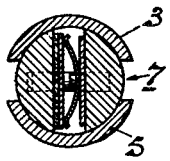

In order that the invention may be readily carried into effect, it will now be described with reference to the accompanying drawing, given by way of example, in which Fig. 1 shows in axial section and Figs. 2 and 3 in cross-section one embodiment of the invention.

The stationary part of the tunable Lecher line system shown in the drawing comprises a metal tube 1 which is incised, in a plane through the axis, to a point near one of the ends (in Fig. 1 the left-hand end). In a section at right angles to the axis (Fig. 2) limbs 3 and 5 thus obtained have the form of two diametrically opposed arcs of a circle. The free ends A and B of the limbs 3 and 5 may, for example, be connected to the anodes of two oscillator tubes (not shown).

Rotatable and slidable in the tube 1 is a bridge 7 comprising two metal parts 9 and 11 which, in cross-section are shaped as circle-segments and may, for example, consist of red copper. Said parts are diametrically opposed and their outlines form arcs of a circle having a diameter substantially equal to the inside diameter of the tube 1. The flat of segment 11 forms one of the electrodes of a capacitor which further comprises a plate 13, which acts as a dielectric and may consist of polyvinyl chloride, and a metal plate 15 acting as a counter-electrode. By means of two screws 21 a rod- or ribbon-shaped insulating control member 17 and a curved plate spring 19 are secured to the flat of the segment 9. The spring 19 spaces the two segments apart and urges them against the inner side of the limbs 3 and 5. Together with the screws 21 this spring moreover establishes a conductive connection between the electrode 15 and the segment 11. Secured in a cavity of the segment 9 is an insulating rod 23 which extends at right angles to the flat of the segment and passes through mating apertures of the parts 17, 19, 15 and 13 into a rather amply fitting cavity of the segment 11, this rod serving to hold the assemblage together when displacing the bridge 7.

As appears from the foregoing, the capacitor 11, 13, 15 is connected between the segments 11 and 9. When displacing the bridge 7 in the direction of the free end of the Lecher line system (in Fig. 1 to the right) by means of the control member 17, the frequency to which the Lecher line is tuned decreases, as is known. When displacing it in the other direction the frequency increases till the bridge reaches the intact left-hand part of the tube 1.

When subsequently turning the bridge 7 through 90° (Fig. 3) by means of the rod 17 no change occurs, but when shifting the bridge to the right the two segments 9 and 11 constitute a short-circuit between the limbs 3 and 5 which results in increasing the resonance frequency and this, as is known, to an increasing degree according as the bridge is shifted farther to the right.

The device described consequently yields a double frequency variation without the distance through which the bridge is displaceable in a given direction needing to be greater. In many cases this permits of avoiding an exceedingly great length of the device. In one example of the device of the aforesaid type, where the total length of displacement of the bridge was 10 cm. in one direction, a total frequency range of 250 to 750 mc./s. could be commanded in two parts of 250 to 400 mc./s. and 400 to 750 mc./s. respectively.

As will be seen from the foregoing, the bridge itself moreover constitutes a switch for changing over from the capacitative bridge to the short-circuiting bridge, and conversely. Besides a structurally simple solution, this yields the advantage of dispensing with separate change-over contacts in the bridge-circuit.

What is claimed is:

1. A tunable Lecher line system comprising a Lecher line having spaced limbs forming in cross-section two diametrically opposed arcs of a circle, and a bridge structure slidably and rotatably disposed within said limbs, said bridge structure comprising two metal parts which in cross-section substantially form two diametrically opposed arcs of a circle and a capacitor interposed between said two metal parts, said bridge structure constituting in one position a capacitive bridge connected between said limbs and in a position turned 90° from said one position constituting a short-circuiting bridge between said limbs.

2. A tunable Lecher line system, as set forth in claim 1, wherein said Lecher line comprises a tube incised in a plane through the axis thereof to form a slot extending to a point adjacent one of its ends.

3. A tunable Lecher line system, as set forth in claim 1, wherein one of said two metal parts constitutes one electrode of said capacitor and wherein said bridge structure further includes a dielectric layer, a plate-shaped second capacitor electrode, said layer being interposed between said electrodes, and a curved plate spring disposed between said electrode and the other metal parts to urge said second electrode against said dielectric.

4. A tunable Lecher line system comprising a Lecher line constituted by a tube incised in a plane through the axis thereof to form a slot extending to a point adjacent one of its ends to define two spaced limbs therein, a bridge structure slidably and rotatably disposed within said limbs, said bridge structure comprising two metallic parts having in cross-section the form of opposed segments, a dielectric layer, a plate-shaped electrode and a curved plate spring interposed in successive arrangement between said two parts, one of said parts, said dielectric layer and said plate-shaped electrode constituting a capacitor connected between said limbs when said bridge is in one position, and said bridge structure constituting a short-circuit between said limbs when in a position turned 90° from said one position.

No references cited.